April 23, 1968

H. H. McNASH 3,379,798

METHOD FOR FORMING A PLASTIC LINER FOR A RECEPTACLE

Filed Nov. 20, 1964

INVENTOR.
HOWARD H. MC NASH

BY
Tilberry & Body
ATTORNEYS

April 23, 1968   H. H. McNASH   3,379,798
METHOD FOR FORMING A PLASTIC LINER FOR A RECEPTACLE
Filed Nov. 20, 1964   3 Sheets-Sheet 2

INVENTOR.
HOWARD H. McNASH
BY
Tillbury & Body
ATTORNEYS

April 23, 1968 H. H. McNASH 3,379,798
METHOD FOR FORMING A PLASTIC LINER FOR A RECEPTACLE
Filed Nov. 20, 1964 3 Sheets-Sheet 3

INVENTOR.
HOWARD H. McNASH
BY Tilberry & Body
ATTORNEYS

United States Patent Office 3,379,798
Patented Apr. 23, 1968

3,379,798
METHOD FOR FORMING A PLASTIC
LINER FOR A RECEPTACLE
Howard H. McNash, Cleveland, Ohio, assignor to
Van Dorn Company, Cleveland, Ohio
Continuation-in-part of application Ser. No. 354,874,
Mar. 26, 1964. This application Nov. 20, 1964, Ser.
No. 414,506
5 Claims. (Cl. 264—25)

ABSTRACT OF THE DISCLOSURE

There is provided a method of deep drawing a plastic sheet into a liner for a drum. This method includes the steps of heating the sheet with an infra-red generator or burner developing a heat density of at least 7 kw./ft.$^2$ and then stretching the sheet at least approximately 450% into a mold.

---

The present invention pertains to the art of forming a thin plastic sheet and more particularly to a method and apparatus for forming a thin plastic sheet into a protective liner for a deep receptacle, such as a drum.

This application is a continuation-in-part application of my copending application S.N. 354,874, filed March 26, 1964, now abandoned.

The invention is particularly applicable to a method for forming a thin plastic sheet of polyethylene, ethylene-vinyl acetate or other thermoplastic material, into a protective liner for a metal receptacle, such as a drum and it will be described with particular reference thereto; however, it will be appreciated that the invention has much broader applications and may be used to form a plastic liner from various other thermoplastic materials for a non-metallic, as well as a metallic, receptacle.

When handling paints, foodstuffs and chemicals in five and fifty-five gallon drums, and in other large receptacles, it is often necessary to provide a protective liner for the receptacle which liner is non-impervious to the material being handled. In the past, it was common practice to form a plastic liner in the receptacle by a dipping or spraying process wherein a plastic coating was deposited onto the interior surfaces of the receptacle. These processes were expensive, often resulted in surface imperfections and resulted in a plastic liner which could not be economically removed from the receptacle so that the receptacle could be reused. In addition, the non-uniformity of the dipped or sprayed plastic liner, and the material used in such a liner, often did not allow handling of some corrosive chemicals and foodstuffs in the receptacles.

Consequently, a great demand has developed for a liner, especially a liner for a five or fifty-five gallon drum, which liner is uniform, is economical to produce and can be removed for subsequent use of the drum or receptacle with another liner. One process which has been developed in an attempt to meet this demand involves the production of a long plastic tube with a diameter substantially corresponding to the diameter of the drum for which the liner is being made. This plastic tube is cut into short lengths corresponding generally with the height of the drum and one end of the short length is heat sealed to produce a closed plastic liner. Not only is the liner produced by this process quite expensive, the liner often ruptures at the heat seal during use. Thus, this process has not been completely successful.

In the art of forming plastic articles it is common practice to draw a heated plastic sheet into various desired shapes. A variety of plastic drawing methods are known; however, these methods generally include the provision of a mold, an electrical heating element for heating the plastic sheet to a temperature above the heat distortion point, and a source of vacuum for drawing the heated plastic sheet against the walls of the mold. These methods are considerable less expensive in operation than the heat seal method of producing receptacle liners described above, and it would seem that such methods would be well adapted for producing liners for large drums and other such receptacles. However, these known plastic drawing methods cannot produce a draw of sufficient depth to produce a liner for a deep receptacle such as a fifty-five gallon drum, especially when a low Melt Index plastic is used.

In addition, when a substantial draw is required, the known plastic sheet drawing methods require a plastic sheet having a considerable thickness. The thickness of the sheet, of course, varies with the length of the draw. Thus, when a deep draw is required, the thickness of the sheet is considerably greater than the thickness actually required for the end product. This difficulty results in a considerable amount of wasted material when the draw approaches a depth necessary for a liner in a deep container of the type described.

The present invention is directed toward a method for producing a drawn plastic liner which overcomes all of the disadvantages of the prior plastic drawing methods so that a drawn plastic liner having a minimum wall thickness can be produced for a receptacle, such as a five or fifty-five gallon drum.

In accordance with the present invention there is provided a method of forming a thin, thermoplastic sheet into a receptacle liner comprising the steps of providing a mold having a periphery and depth corresponding generally to the periphery and depth of the receptacle and a perforated bottom, clamping the edges of the plastic sheet leaving an unclamped area corresponding to but slightly larger than, the mold periphery, heating the unclamped area with a high heat density, infra-red generator developing a heat density of at least approximately 7 kw./ft.$^2$ until the temperature of the unclamped sheet area exceeds the heat distortion point or temperature of the sheet, securing the clamped sheet over the mold with the heated area over the top of the mold, forcing the sheet into the mold to a position spaced from the bottom thereof, closing the top of the mold, and, immediately thereafter, expanding the sheet at least approximately 450° into the mold by compressed gas.

The method as defined above utilizes a gas fired, infra-red generator for heating the thin plastic sheet before it is forced against the walls of the mold. This type of generator has a large continuous radiating surface and develops a substantially higher heat density than other convection and radiant heaters. This is one important aspect of the present invention. In the past, methods for drawing plastic sheets have heated the sheets with one or more electric heating elements which elements could only generate a heat density of 1–2 kw./ft.$^2$. Thus, even if a heating element were placed on each side of the plastic sheet, only about 4 kw.ft.$^2$ could be directed toward the plastic sheet by such electric heaters. When utilizing a gas fired, infra-red generator, a heat density of 7–15 kw./ft.$^2$ can be obtained from each unit. This high heat density is caused by the high B.t.u. output of the gases burning on the screen of the generator and the large continuous area of the burner screen. Thus, the use of a gas fired, infrared generator more than doubles the heat density of the heating step in the drawing method and completely changes the heating cycle from that previously obtained by the electric heating elements. The heating is accomplished at a substantially different rate so that reflection of the heat energy is minimized. The use of a gas fired, infra-red generator, as contemplated in the present invention, allows a draw of sufficient depth to produce a thin plastic liner for a receptacle as described above where the electric heating units heretofore used in heating the thin plastic sheet could not produce a heated sheet which could be drawn to this depth.

Other features of the present invention, such as the use of pressurized gas and the size and position of the draw assisting plug contribute substantially to the ultimate success of the present invention and these features will be hereinafter described in detail.

The term "heat distortion temperature or point" as used herein indicates the temperature at which the thin plastic sheet must be heated to allow substantial plastic deformation of the sheet without rupture. For high density polyethylene, i.e. approximately 0.900, such a temperature is approximately 225° F. and for some of the lower density polyethylene, i.e. substantially lower than 0.900, the heat distortion point may be as low as 175° F. It is appreciated that this heat distortion point may vary according to the density and Melt Index of the plastic material being formed.

The thin plastic material from which the receptacle liner is produced must be thermoplastic and have the necessary physical characteristics so that it can respond to a deep draw without rupture when heated to or beyond the heat distortion point. The term "deep draw" is difficult to define; however, it can be roughly categorized as a draw wherein there is more than 200% stretching of the surface area of the thin sheet during the draw and in the preferred embodiment of the present invention, such a term refers to a draw resulting in 450-700% surface stretching. By using the present invention, a 50-mil high density, non-linear, polyethylene sheet can be drawn into a shape wherein the surface stretching exceeds 500%. This has heretofore been impossible or, at least, required very expensive equipment. In accordance with the present invention, a great number of plastic materials can be used; however, it is preferred to use high or low density polyethylenes, ethylene homopolymers or ethylene copolymers which have a Melt Index within the range of 0.20-0.50 and a density greater than 0.900. In practice a polyethylene with a Melt Index of 0.40 and a density of 0.917 has proven satisfactory. Also, ethylene-vinyl acetate copolymer has proven satisfactory because of its extreme strength with small wall thicknesses. This material is a copolymer with a density (g./cm.$^3$) of .937, a heat distortion temperature of about 160° F., and a Melt Index of 1.5. Such a material is sold under the trademark of Ultrathene by U.S. Industrial Chemicals Co.

The primary object of the present invention is the provision of a method for forming a thin plastic sheet into a deep drawn protective liner for a receptacle, such as a five or fifty-five gallon drum.

Still a further object of the present invention is the provision of a deep drawn receptacle liner as defined above which liner has a uniform wall thickness and requires a minimum of plastic material.

Another object of the present invention is the provision of a method for forming a thin plastic sheet into a deep drawn protective liner for a deep receptacle wherein the plastic sheet is heated by a gas fired, infra-red generator before being drawn or blown into a deep mold to the depth of the receptacle.

Yet another object of the present invention is the provision of a method for forming a plastic sheet into a deep drawn protective liner for a receptacle wherein the sheet is heated above the heat distortion point, placed over a mold having a shape corresponding with the shape of the receptacle, and, then, forced into the mold by pressurized gas.

Still a further object of the present invention is the provision of a method for forming a thin plastic sheet into a deep drawn protective liner for a receptacle wherein the liner is formed with a retaining lip adapted to be resiliently received by a top bead surrounding the opening of the receptacle.

Another object of the present invention is the provision of a method for forming a thin plastic sheet into a deep drawn protective liner for a receptacle wherein the sheet is heated above the heat distortion point, placed over a mold having a shape corresponding substantially to the shape of the receptacle, and, then, forced into the mold at a rate sufficient to prevent substantial stress concentrations from forming within the liner.

Still another object of the present invention is the provision of a method for forming a thin plastic sheet into a deep drawn protective liner for a receptacle wherein the sheet is heated above the heat distortion point, placed over a mold having a shape substantially the same as the shape of the receptacle and, then, forced into the mold in a controlled pattern so that the thickness of the liner wall is substantially uniform.

Yet another object of the present invention is the provision of a method for forming a thin plastic sheet into a deep drawn liner having a substantially greater wall thickness at the bottom of the liner, than along the sides of the liner.

These and other objects and advantages will become apparent from the following description used to illustrate the preferred embodiments of the present invention as read in connection with the accompanying drawings in which:

FIGURES 5 and 6 are cross sectional, side elevational views illustrating, somewhat schematically, the operating sequence of the apparatus as disclosed in FIGURES 2 and 2a;

Figure 1:
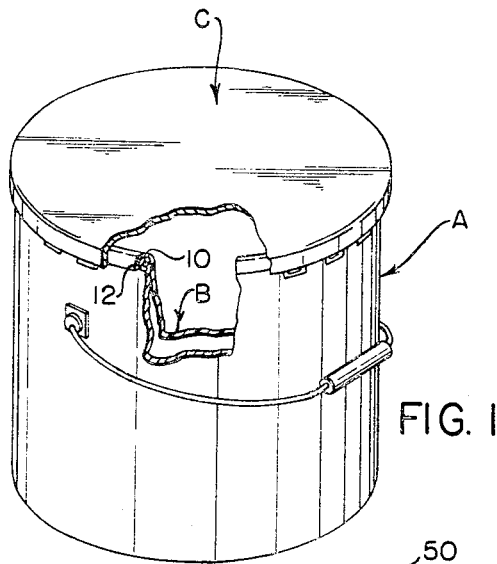
FIGURE 1 is a pictorial, partially cut away view illustrating a receptacle having a deep drawn liner constructed in accordance with the present invention.

Referring now to the drawings wherein the showings are for the purpose of illustrating preferred embodiments of the invention only and not for the purpose of limiting same, FIGURE 1 shows a metal receptacle A of the type used in handling paint and other chemicals, which receptacle is commonly known as a five gallon can or receptacle. The receptacle has an upper rolled bead 10 (best shown in FIGURE 9) and an internal liner B with an upper snap-on channel 12 adapted to be positioned over bead 10 to removably secure the liner in the receptacle. The receptacle is provided with a conventional lid or cover C. Liner B is made of a plastic material, as will be explained below, so that it forms a protective barrier between the material being handled within the receptacle and the walls of the receptacle.

The present invention pertains to a method for forming the liner B to be used in the five gallon can A, in fifty-five gallon drums, and in other deep metal receptacles for handling chemicals and other similar materials. The term "deep" indicates that the internal surface area of the receptacle is over 200% of the transverse area of the receptacle and preferably 450–700% of this transverse area. The liner B, in accordance with the present invention, is formed from a generally flat, thin thermoplastic sheet 20 which sheet can be formed from various thermoplastic materials as long as the material will allow a deep draw of the thin sheet after it has been heated to its heat distortion temperature or point in accordance with the present invention. The term "thin," as applied to the sheet 20 indicates that the sheet is substantially 50–100 mils in thickness when the draw results in a 450–700% increase in the surface area of the sheet.

In accordance with the preferred embodiment of the present invention, high or low density polyethylene, ethylene homopolymers and ethylene copolymers having a Melt Index between 0.2 and 0.5 and a density greater than 0.900 and less than 0.925 or a copolymer, such as ethylene-vinyl acetate, with a Melt Index of 1.5 and a density of .937 are used. The thin sheet 20 has a thickness determined by the amount of draw necessary for forming the sheet into a shape which will conform to the internal walls of the receptacle A.

The apparatus for practicing the present invention may take a variety of structural embodiments; however, in accordance with the illustrated embodiment of the present invention, the apparatus includes a mold 22 having a periphery (which indicates the configuration of the side walls) and depth corresponding generally to the periphery and depth of the internal walls of receptacle A. The peripheral area of the mold is the area of transverse plane through the mold and bound by the periphery of the mold. This term is synonymous with "transverse area" of the mold or receptacle.

Around the top of the mold 22 is a bead 24 conforming generally to the shape of bead 10 on receptacle A and for a purpose to be hereinafter described in detail. The lowermost portion of the mold 22 is defined by a perforated bottom 26 which, in accordance with the illustrated embodiment of the present invention, is formed from a medium mesh metal screen. Below the perforated bottom 26 there is located a lower exhaust chamber 28 having a plurality of peripherally spaced apertures 30 which communicate the chamber 28 and, thus, the portion of the mold 22 above the bottom 26 with the surrounding atmosphere.

Positioned above the opening at the top of the mold 22, is a draw assisting plug or ram 40 having a lower plate 42, an upper plate 44 and a connecting rod 46 adapted to secure the plates in spaced parallel relationship. In accordance with this embodiment of the present invention, the lower plate 42 is provided with a heat pad 48 adapted to be connected to a source of electrical current by cord 50. The details of the heat pad 48 and cord 50 have been eliminated since they may take a variety of structural embodiments and their operation is easily understood. The connecting rod 46 is provided with a centrally disposed manifold chamber 51 communicated with a plurality of outlet orifices 52 so that the orifices can be supplied with pressurized gas furnished to the plug 40 at inlet nipple 54. To seal the upper opening of mold 22, the upper plate 44 is provided with an annular seal 56.

Figure 2A:
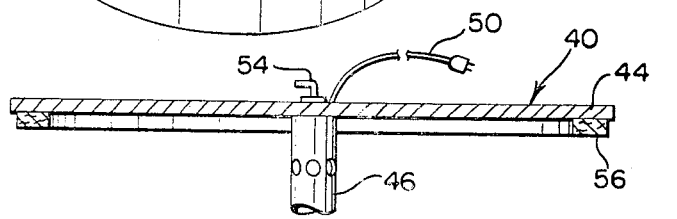
FIGURE 2a is a partial, cross sectional view of a modification of the embodiment shown in FIGURE 2.
Figure 2A:
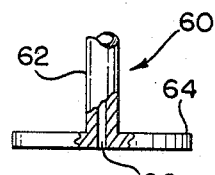
Figure 2:
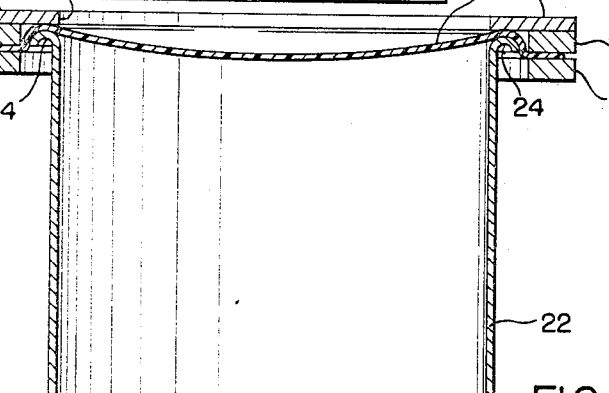
FIGURE 2 is a cross sectional, side elevational view illustrating, somewhat schematically, one embodiment of the present invention.

The draw assisting plug 40 as shown in FIGURE 2 includes orifices 52 for directing air pressure above lower plate 42 and a heat pad 48 for heating the lower plate. These structures are eliminated from the plug 60 shown in FIGURES 2a, 5 and 6 wherein the connecting rod 62 supports lower plate 64 and the nipple 54 is communicated with an outlet 66 for directing gas below the bottom plate 64. Although it has been found that the present invention can be practiced by a draw assisting plug similar to plug 40, as shown in FIGURE 2, in accordance with the preferred embodiment of the present invention, the plug 60 is used and certain benefits are gained therefrom which benefits will be hereinafter described in detail.

Figure 5:
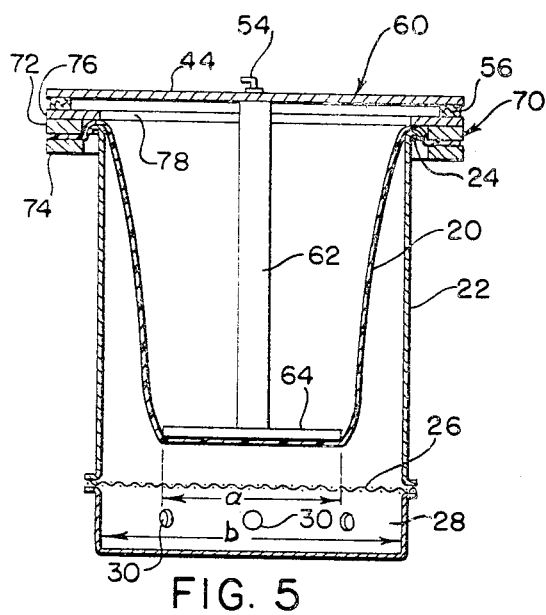

The sheet 20 is clamped within frame 70 between clamp rings 72, 74 which rings leave an unclamped portion of the sheet which portion corresponds to, but is slightly larger than, the periphery area of mold 22 as is seen in FIGURE 2. Clamp rings 72, 74 can be hinged together and provided with appropriate clamping arrangement (not shown) so that the edges of the sheet 20 are tightly held between the rings. Above the ring 72 there is secured a stop or sealing ring 76 which ring has an opening 78 generally conforming to the periphery of mold 22 which opening allows insertion of draw assisting plug 60 into the mold 22 as shown in FIGURE 5. The stop ring 76 rests upon the top of the sheet 20 to prevent stretching of the edges of the sheet when the sheet is heated and placed over the top of the mold 22 as shown in FIGURE 2. This ring also seals the space above bead 24 by forcing the sheet 20 under slight pressure against the top of this bead.

Figure 3:
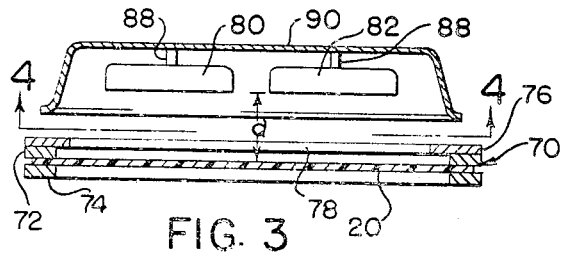
FIGURE 3 is a cross sectional, somewhat schematic view illustrating the heating unit used for heating the thin plastic sheet in accordance with the present invention.
Figure 4:
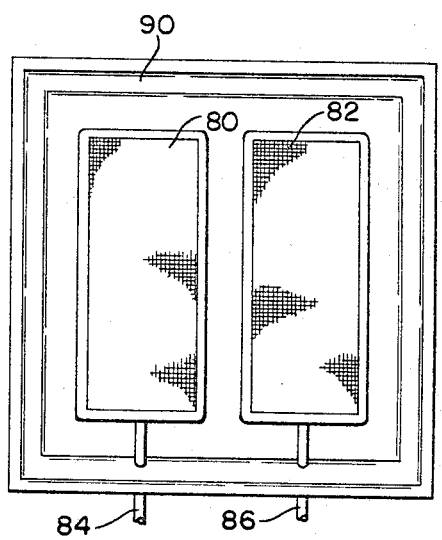
FIGURE 4 is a plan view taken generally along line 4—4 of FIGURE 3.

Referring now to FIGURES 3 and 4, there is illustrated an important aspect of the present invention. In the past, when drawing a thin sheet having the properties of sheet 20, an electric heating element was positioned on one or both sides of the sheet. Such an electric heating element developed a heat density of only 1–2 kw./ft.$^2$ so that the sheet was gradually heated to the heat distortion point. In accordance with the present invention, the sheet is heated by a completely different process wherein the sheet 20 is subjected to a heating unit developing a heat density of 7–14 kw./ft.$^2$ and even higher. To accomplish this type of heating, the thin sheet 20 is subjected to the heating effect of two spaced gas fired, infra-red generators 80, 82 furnished with natural gas or other appropriate fuel through lines 84, 86, respectively. The heating units are secured by brackets 88 onto a reflector 90.

In accordance with the present invention, the generators 80, 82 each have a large continuous burning surface of approximately one square foot and each burner develops 25,000 B.t.u./hour. Converting this heat energy into the heat density generated by the units, it is found that the burners develop approximately 7.4 kw./ft.$^2$. If the gas fired, infra-red heaters were positioned on both sides of the sheet 20, the heat density generated by the two heating units would approach 14.8 kw./ft.$^2$. It is noted that this is considerably different from the heat density of 1–2 kw./ft.$^2$ generated by a corresponding electric heating element. When heating the sheet 20 with generators 80, 82 the sheet absorbs the heat at a rapid rate that brings the sheet to a temperature exceeding the heat distortion point in a very short time. It has been found that a polyethylene sheet having a thickness of 100 mils heated by the low heat density electric heaters to a temperature exceeding the heat distortion point (225° F.) would rupture when it was attempted to draw the sheet into the mold 22 where the surface stretching was approximately 650%; however, when an identical sheet was heated to a temperature exceeding the heat distortion point by the gas fired infra-red generators 80, 82 it could be easily drawn into the mold 22 without rupture. Thus, the heating unit forms a substantial part of the present invention.

In operation of the present invention, the sheet 20 is selected with the necessary thickness to allow draw of the sheet into the mold 22, i.e. when surface stretching is approximately 700%, the sheet, if polyethylene, is 100 mils. When the sheet is to be drawn with a 500% increase in surface area, a 50-mil sheet has been used. The sheet is clamped between the clamping rings 72, 74 and is positioned beneath the infra-red generators 80, 82 as shown in FIGURE 3. The sheet is positioned from the burning surface of the generators a distance $d$ which, in accordance with the present invention varies between 12 and 15 inches with both 50-mil and 100-mil sheets of polyethylene. The sheet must be heated to a temperature exceeding the heat distortion point; therefore, a timer may be used to indicate when the sheet has been heated properly. This requires about one minute for low density polyethylene and about two minutes for high density polyethylene.

In the case of natural polyethylene, the sheet has been heated to the desired degree when the frosted color of the sheet disappears and the sheet is substantially clear, i.e. when the crystalline structure of the sheet has been substantially eliminated. Then, the frame 70 is rapidly moved to the mold 22 so that the sheet 20 is placed over the opening of the mold. The ring 76 rests upon the bead 24 and the sheet is stretched around the bead by the clamping rings 72, 74. The heated sheet 20 sags into the mold 22 as shown in FIGURE 2 because the low physical strength of the sheet cannot support the weight of the sheet stretched across the top of the mold 22.

After the heated sheet has been positioned over the top of mold 22, the draw assisting plug 60 as shown in FIGURE 5, is given downwardly into the mold 22 with the lower plate 64 contacting sheet 20 and drawing sheet 20 downwardly into the mold. The downward travel of plug 60 is determined by the length of connecting rod 62. The upper opening of the mold 22 is closed by seal 56 contacting the upper surface of stop ring 76. In this manner, the upper bulbous portion of sheet 20 below plate 40 is substantially air tight.

Figure 6:
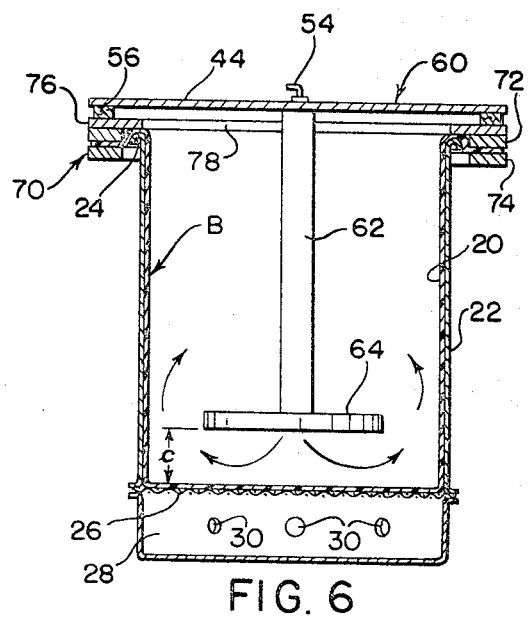

Referring now to FIGURE 6, after the plug 60 forms the sheet downwardly into the mold 22, pressurized gas, i.e., air, is introduced into nipple 54 and travels through connecting rod 62 and exits at outlet 66 as shown in FIGURE 6. Pressurized gas forces the sheet 20 against the side walls and perforated bottom 26 of the mold 22 so that the sheet conforms to the inner surfaces of the mold and forms the protective liner B.

The action of the air on the sheet 20 is an important aspect of the present invention. The periphery of lower plate 64 has a dimension $a$ and the mold 22 has a peripheral or inner dimension $b$. In accordance with the preferred embodiment of the present invention, the dimension $a$ is approximately 75% of dimension $b$. This relationship between the dimensions should not exceed approximately 90% because the air flowing from under the plate 74 must flow to the portion of the mold 22 above lower plate 64 in a very short time. This short time lapse allows the sheet to be formed completely against the surfaces of the mold before the outer surface of the sheet is cooled by the mold walls. If the outer surface of the sheet 20 is cooled before the inner surface has a chance to flow into the proper position, certain stress concentrations are set up which could be detrimental to the ultimate success of liner B.

Lower plate 64 is spaced from perforated bottom 26 a distance $c$ which distance is approximately 10 inches when the mold 22 is in the shape of a fifty-five gallon drum and has a depth of about 33 inches and approximately 3 to 4 inches when the mold is in the shape of a standard five gallon can or drum and has a depth of about 12 inches. Thus, the lower plate 64 is positioned in the lower one-third of the mold 22 but is spaced substantially from the bottom 26.

As the lower plate 64 contacts sheet 20 and pulls the sheet into mold 22, the sheet directly below the lower plate does not stretch to a great extent while the other portions of the sheet are stretched considerably. Thus, when air is forced from outlet 66 beneath plate 64, it stretches the previously unstretched portion of sheet 20 so that when the liner B is formed, the liner has a somewhat uniform thickness. If the plate 64 were moved downwardly against perforated bottom 26, the air would have to be supplied to mold 22 in a manner shown in FIGURE 2 wherein the orifices 52 are above plate 42. By this arrangement, the lower wall of liner B would have a greater thickness than the side wall.

The introduction of air beneath plate 64 is preferred; however, it is apparent that air may be introduced into the mold from a position above the plate without departing from the intended spirit and scope of the present invention. In addition, the plate 64 may contact the perforated bottom 26 although this is not in accordance with the preferred embodiment and substantial benefits are realized by providing a space between the downwardly-most position of plate 64 and the perforated bottom 26 as shown in FIGURES 5 and 6.

The plate 64 is not heated although it may be in accordance with the disclosure of FIGURE 2. Heating lower plate 64, or even the mold, delays the cooling time of the liner B and allows the plastic material to flow into the final position before localized solidification occurs. Thus, stress concentrations are less prevalent.

Figure 7:
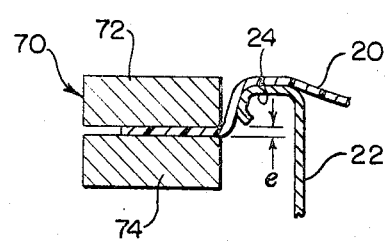
FIGURES 7–9 are partial, cross sectional views illustrating, somewhat schematically, one aspect of the present invention.
Figure 8:
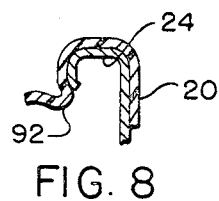
Figure 9:
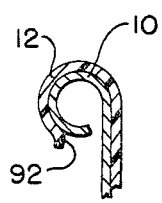

FIGURES 7–9 disclose an important aspect of the present invention. Irrespective of the drawing method utilized in shaping the liner B, the present invention includes a novel arrangement for securing the liner within the receptacle A. Referring now to FIGURE 7, the clamping rings 72, 74 pull the heated sheet 20 around bead 24 of mold 22 and the sheet is clamped at a position so that the clamped sheet is spaced from the lower edge of the bead 24 a distance $e$. In accordance with the preferred embodiment of the present invention, this distance is approximately ¼-inch. After the sheet 20 has been drawn and blown into the desired shape, the sheet cools. When the sheet cools, the sheet beneath bead 24 tends to shrink inwardly forming a shoulder 92 as shown in FIGURE 8. When the excess material is trimmed from the liner B, the shoulder 92 remains and is used as a resilient lock to hold the channel 12 on bead 10, as shown in FIGURE 9. Thus, a very inexpensive arrangement is provided for removably holding the liner B within the metal receptacle A. It is appreciated that the bead 24 can have a variety of shapes and still provide the resilient holding feature; however, in accordance with the preferred embodiment of the present invention, the bead 24 substantially corresponds with bead 10.

In accordance with one aspect of the invention, the vertical surfaces of the mold may have an uneven texture which will impart a design to the walls of the liner. This adds to the heat insulating characteristics of the finished liner and also prevents trapped gases from forming pockets along the surfaces of the mold. Such a texture has been accomplished by lining the mold with fine mesh metal screening.

The present invention has been used to produce a liner for a fifty-five gallon drum wherein a 100 mil natural polyethylene sheet was heated by two gas fired infra-red burners developing a heat density of approximately 8 kw./ft.$^2$ until the sheet was substantially clear. Immediately thereafter, the sheet was placed over a mold shaped like the drum and then the sheet was drawn by a plug into a shape as shown in FIGURE 5. Then the sheet was blown into the mold as shown in FIGURE 6. The increase in surface area of the sheet was approximately 700% and the sheet did not rupture.

The bottom wall of a drum usually carries the major portion of the load; therefore, when carrying substance within a drum provided with a liner or coating of any type, it is most times desirable to provide a bottom wall having a greater thickness than the side walls. FIGURES 10–13 illustrate a method and apparatus for providing the liner B with a heavy or thicker bottom wall than provided by the method illustrated in FIGURES 1–7. In these figures, there is illustrated an apparatus D having a plug or ram 100, a sheet holding frame 102 and a mold 104 with an internal shape corresponding substantially to the shape which is to be imparted to the liner B. Ram 100 includes a gas inlet nipple 110, an annular sealing ring 112, an upper plate 114, a bottom ram plate 116 and a rod 118 having a central gas passageway 119. This ram corresponds substantially to the plug or ram 60 as illustrated in FIGURE 6. Frame 102 includes clamping rings 120, 122 and a sealing or stop ring 124 having an opening 126 which will allow movement of plate 116 downwardly into mold 104. In accordance with this embodiment of the invention, mold 104 includes an upper peripherally extending bead 130, a lower perforated bottom 132, and a lower exhaust chamber 134 having peripherally spaced apertures 136. The apparatus as so far explained does not differ substantially from the apparatus shown in FIGURES 1–6; however, the operating steps for using the apparatus D are somewhat different from the operating steps utilized in connection with the other embodiments of the present invention.

Figure 10:
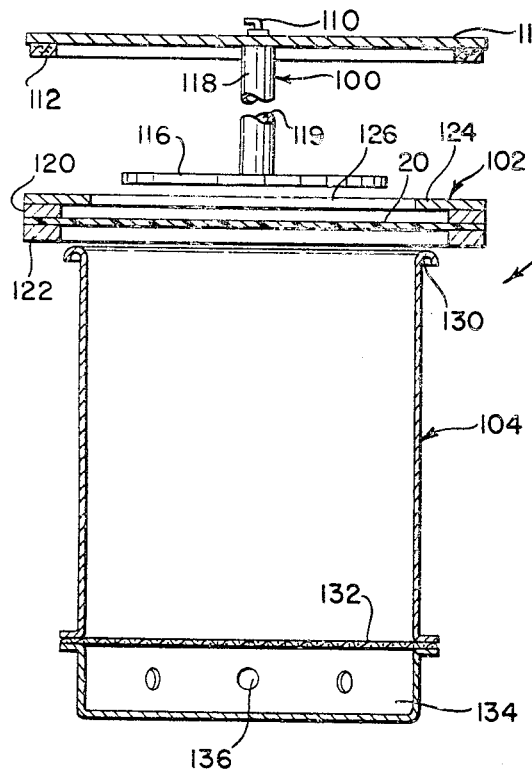
FIGURES 10 and 11 are cross sectional, side elevational views illustrating a further modification of the present invention.
Figure 12:
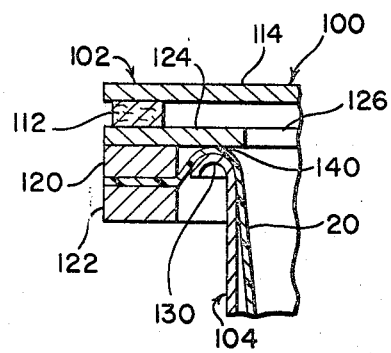
FIGURE 12 is an enlarged, partial, cross sectional view illustrating another operating step of the modification as shown in FIGURES 10 and 11; and, FIGURE 13 is a partial, cross sectional view illustrating still another operating step of the modification as shown in FIGURES 10 and 11.

Referring now to FIGURE 10, the sheet 20 is heated, in the manner previously described, and the heated sheet is clamped within frame 102. Then, the frame 102 is positioned directly above mold 104. The ram or plug 100 is moved downwardly to a position shown in FIGURE 11. It is noted that the frame 102 has not yet been moved downwardly to wrap the sheet 20 around bead 130. Consequently, the sheet 20 is stretched by plate 116 over the complete area of the sheet which is unclamped by rings 120, 122. This uniformly stretches a major portion of the sheet; however, the sheet below the plate 116 has not been stretched to the same extent as the remainder of the sheet. Thus, the sheet below plate 116 is thicker than the remaining portions of the sheet. After the original stretching of sheet 20, the frame 102 is forced downwardly into a position shown in FIGURE 12 wherein the sheet 20 is stretched around the bead 130. This provides a relatively thin layer 140 between the bead 130 and the sealing or stop plate 124. By prestretching the bead area of the sheet 20 before it is forced over the bead 130, a more even strip thickness is provided around the upper portion of the bead.

Figure 11:
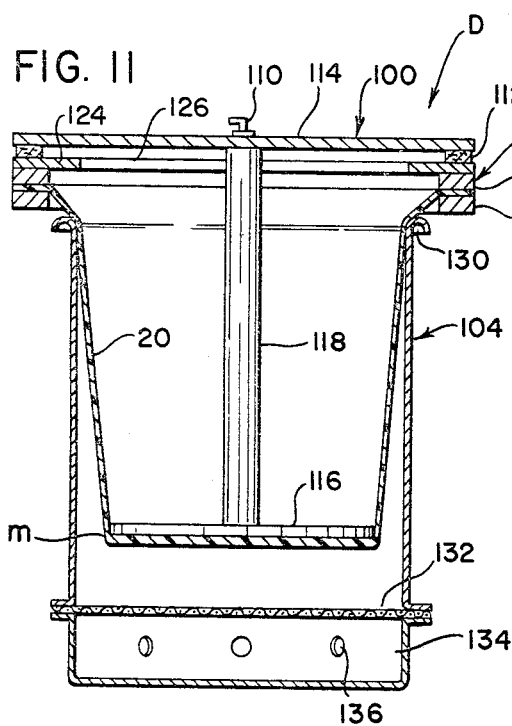
Figure 13:
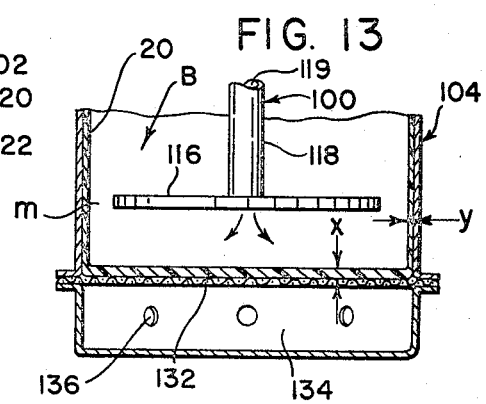

After the sealing plate 124 engages the upper surface of sheet 20 above the bead 130, air or other pressurized gas is introduced at nipple 110 to blow the sheet 20 into intimate contact with the inner surface of mold 104, see FIGURE 13. In accordance with this aspect of the invention, the blowing operation is delayed a substantial time after the initial stretching as shown in FIGURE 11. This time delay allows the material below plate 116 to cool somewhat so that subsequent blowing as shown in FIGURE 13 will force the sheet into engagement with the inner surfaces of the drum without reducing the thickness of the material adjacent the lower portion of the liner to the same extent as the sheet 20 was previously reduced in thickness by the stretching operation. Consequently, the side walls of the liner B will have a thickness $y$ which is substantially less than the thickness $x$ at the bottom portion of the liner. This enhances the load carrying characteristics of the liner.

In practice, a five second time delay is utilized between the stretching operation as shown in FIGURE 11 and the blowing operation as shown in FIGURE 13. When utilizing ethylene-vinyl acetate having a thickness of 100 mils, this five second time delay provides a substantially thicker bottom wall than the side walls. Of course, the increased thickness progresses upwardly along the side walls of the mold to a position $m$ as indicated in FIGURES 11 and 13. The sheet 20 above position $m$ was previously stretched. The material accumulated below the plate 116 during the stretching operation is forced into the remaining bottom portion of the mold which encompasses a surface area which does not require as much stretching of the sheet 20. To increase the thickness of the lower portion, the position $m$, determined by the downwardmost position of plate 116 may be changed. Also, the amount of time delay between the stretching and the blowing operation may be varied. The latter process variation does not have as much effect on the difference in thickness as the location of position $m$. Another means for changing the thickness of the bottom wall is to change the area of plate 116. As the area of the plate decreases, the resulting wall thickness of the bottom portion also decreases because less material is provided for filling the portion of the mold below the plate. Any one of these variables may be changed to obtain the desired thickness for the bottom wall of liner B.

The present invention has been described in connection with certain structural embodiments; however, it is appreciated that various changes may be made in these embodiments without departing from the intended spirit and scope of the present invention as defined by the appended claims.

Having thus described my invention, I claim:

1. A method of deep drawing a thin, thermoplastic sheet into a receptacle liner comprising the steps of providing a mold having a periphery and depth corresponding generally to the periphery and depth of said receptacle, clamping the edge of said sheet leaving and unclamped area corresponding to, but slightly larger than, said mold periphery, heating all of said unclamped area with a gas fired infra-red generator developing a heat density of at least 7 kw./ft.$^2$ until said sheet area exceeds the heat distortion point, securing said clamped sheet over said mold with the heated area over the periphery of said mold, sealing said mold above said sheet, and expanding said sheet into said mold by pressurized gas to an extent causing said sheet to stretch at least approximately 450%.

2. A method of deep drawing a thin, thermoplastic sheet having a thickness in the range of approximately 50–100 mils into a receptacle liner comprising the steps of providing a mold having a periphery and depth corresponding generally to the periphery and depth of said receptacle, clamping the edge of said sheet leaving an unclamped area corresponding to, but slightly larger than, said mold periphery, heating all of said unclamped area with a gas fired infra-red generator developing a heat density of at least 7 kw./ft.$^2$ until said sheet area exceeds the heat distortion point, securing said clamped sheet over said mold with the heated area over the periphery of said mold, sealing said mold above said sheet, and expanding said sheet into said mold by pressurized gas to an extent causing said sheet to stretch in the range of approximately 450%–700%.

3. A method of forming a thin sheet of low melt plastic material into a receptacle liner, said method comprising the steps of providing a mold having a periphery and depth corresponding generally to the periphery and depth of said receptacle, clamping the edge of said sheet leaving an unclamped area corresponding to, but slightly larger than, said mold periphery, heating all of said unclamped area with a gas fired infra-red generator developing a heat density of at least 7 kw./ft.$^2$ until said sheet area exceeds the heat distortion point, securing said clamped sheet over said mold with the heated area over the periphery of said mold, sealing said mold above said sheet, and expanding said sheet into said mold by pressurized gas to an extent causing said sheet to stretch in the range of 450%–700%.

4. A method of drawing a thin thermoplastic sheet into a receptacle liner comprising the steps of providing a mold having a periphery and depth corresponding generally to the periphery and depth of said receptacle, and a top bead around the periphery of said mold corresponding generally to a bead around the top of said receptacle, said top bead having a radially outwardly facing portion, clamping the edges of said sheet leaving an unclamped area corresponding to, but slightly larger than, said mold periphery, heating said unclamped area with an infra-red generator developing a heat density of at least 7 kw./ft.$^2$ to a temperature exceeding the distortion point of said sheet, drawing said clamped sheet over said radially outwardly facing portion of said top bead of said mold with the heated area extending over the top of said mold, expanding said sheet into said mold by gas pressure to stretch said sheet at least approximately 450%, allowing said sheet to cool with said sheet contracting around and against said top bead and removing said expanded sheet from said mold.

5. A method of deep drawing a thin, thermoplastic sheet into a receptacle liner comprising the steps of: providing a mold having a periphery and depth corresponding generally to the periphery and depth of said receptacle, said mold having a top bead around said periphery and a mold bottom, said bead having an outwardly facing portion; clamping the edge of said sheet leaving an unclamped area corresponding to, but slightly larger than, said mold periphery; heating said unclamped area with an infra-red generator developing a heat density of at least 7 kw./ft.$^2$ until said area exceeds the heat distortion point of said sheet; placing said clamped sheet over said mold with the heated area over the periphery of said mold; stretching said sheet into said mold with said stretching of said sheet being at least approximately 450%; then, stretching said heated sheet around the outwardly facing portion of said bead; sealing the mold above said sheet; and, then, expanding said sheet into said mold by pressurized gas.

References Cited

UNITED STATES PATENTS

| | | | |
|---|---|---|---|
| 2,891,280 | 6/1959 | Politis | 18—19 |
| 2,973,558 | 3/1961 | Stratton | 264—92 X |
| 2,990,581 | 7/1961 | Roue | 264—92 X |
| 3,011,212 | 12/1961 | Marshall et al. | 18—19 X |
| 3,218,379 | 11/1965 | Edwards | 264—93 |
| 3,235,639 | 2/1966 | Knowles | 264—92 |
| 3,280,428 | 10/1966 | Watts | 264—92 |
| 2,736,065 | 2/1956 | Wilcox | 264—92 |

FOREIGN PATENTS 332,588   3/1959   Switzerland.

ROBERT F. WHITE, *Primary Examiner.*

A. R. NOE, *Assistant Examiner.*